United States Patent Office 2,811,252
Patented Oct. 29, 1957

2,811,252

METHYL CHLOROFORM INHIBITED WITH DIOXANE

Howard J. Bachtel, Lake Jackson, Tex., assignor to The Dow Chemical Company, Midland, Mich., a corporation of Delaware No Drawing. Application March 30, 1954,
Serial No. 419,913

13 Claims. (Cl. 206—84)

This invention relates to a composition of matter comprising methyl chloroform and an inhibitor to prevent it from attacking metals.

Methyl chloroform (1,1,1-trichloroethane) is used in industry as a solvent for cleaning grease from metal articles. It is also employed as a volatile propellant, for instance in insecticidal sprays. For these purposes, its relatively low toxicity renders it much safer than other chlorohydrocarbons. On the other hand, methyl chloroform is subject to the serious disadvantage that it is a great deal more reactive with metals than other chlorohydrocarbons are, attacking metals rapidly and itself being seriously decomposed. Inhibitors are sometimes added to the methyl chloroform to control this reactivity, but in general the inhibitors effective with other chlorohydrocarbons are only moderately helpful with methyl chloroform. In particular, no inhibitor heretofore used commercially has been capable of really stabilizing methyl chloroform in contact with aluminum.

This difficulty has been overcome by the present invention, which is based on the discovery that 1,4-dioxane is an extremely effective inhibitor in preventing the decomposition of methyl chloroform, even when it is at its boiling temperature and in contact with aluminum.

The compositions according to the invention consist essentially of methyl chloroform having 1,4-dioxane dissolved therein in a minor proportion sufficient to inhibit decomposition of the methyl chloroform when in contact with metal. Ordinarily, from about 1 to about 10 percent by volume of 1,4-dioxane is employed, with about 4 percent being preferred. Such compositions are highly stable in contact with metals, and may be stored for months in aluminum vessels, and even boiled, without decomposition of the methyl chloroform or attack on the aluminum. Such results are quite unattainable with any inhibitors heretofore used with methyl chloroform.

Unlike former methyl chloroform compositions which had to be stored in galvanized steel or glass containers, methyl chloroform stabilized with 1,4-dioxane according to the invention may be shipped and stored in ordinary black iron drums. No significant attack on the iron, or decomposition of the methyl chloroform, takes place. It has been observed, however, on storage of the new compositions in black iron containers over long periods, e. g. several months, some discoloration of the methyl chloroform-dioxane mixtures may develop. Such discoloration is of no moment for many uses of the methyl chloroform. However, the discoloration may be eliminated, and the methyl chloroform-dioxane mixture maintained water-white, by dissolving therein a minor proportion of a non-primary alkanol containing from four to eight carbon atoms per molecule. Sec. butyl alcohol, tert. amyl alcohol, and 2-octanol have been found particularly effective. The proportion of alkanol required is not large, with as little as 0.01 percent by volume being effective. Proportions up to 10 percent may be used however, with 0.1 to 0.5 percent by volume being usually most satisfactory.

The compositions stabilized according to the invention undergo little or no decomposition or carbonization on storage in metal containers. They likewise show no tendency to attack the metal, even when the methyl chloroform is at the boiling point and the metal is aluminum or any of the commercially used aluminum-base alloys. In addition, the inhibitor appears to be largely effective in preventing attack of metal by the vapor of the stabilized methyl chloroform. Moreover, the inhibiting effect is not lost as the methyl chloroform evaporates, the unevaporated residue being still stabilized. Likewise, the methyl chloroform is stabilized by the inhibitors of the invention even when mixed with other chlorohydrocarbons or other diluents which may be added.

The following examples will illustrate the invention.

*Example 1*

To demonstrate the problem, a test was run on methyl chloroform containing no stabilizer. The test metal was a strip of commercial sheet aluminum 3S (an aluminum-base alloy containing 1.25 percent manganese, balance substantially aluminum). The strip was placed in a glass beaker and covered with methyl chloroform at room temperature. While thus immersed, the strip was scratched ten times with a hard needle to expose fresh surfaces of the aluminum. Reaction of the methyl chloroform with the aluminum began at once, liberating carbon in readily visible form.

After thirty minutes the beaker was filled with a nearly dry black mass of carbon, and the aluminum was badly corroded all over and eaten through in places.

The same procedure was carried out using methyl chloroform containing 3.5 percent by volume of 1,4-dioxane. After 30 minutes the aluminum was unaffected, remaining bright at the scratches. The methyl cloroform was likewise water-white and unaffected.

*Example 2*

A test was carried out on two identical screw-cap bottles, made entirely of aluminum. Each was scratched inside ten times and then immediately filled with methyl chloroform at room temperature. In one flask the methyl chloroform contained no additive, whereas that in the other contained 4 percent by volume of 1,4-dioxane. The uninhibited methyl chloroform began to attack the flask at once, and after 30 minutes foamed out of it, covering it with a black carbonaceous mass. The other flask showed no effect. It was then held at 50° C. for 24 days and still showed no effect. The methyl chloroform, still water-white, was poured out and the flask was sawed through to allow inspection of the inside surface. It was as clean and bright as at the time of filling. The scratches were unaffected, and as clearly defined as when they were made.

*Example 3*

Into a large glass flask was placed one liter of methyl chloroform containing 3 percent by volume of 1,4-dioxane. Aluminum strips, each freshly scratched ten times, were placed in the flask, and the whole was heated to boiling under a reflux condenser. Boiling was continued for 29 days. The aluminum and the methyl chloroform were entirely unaffected at the end of this time. The reflux condenser was then removed and methyl chloroform was allowed to evaporate completely. The aluminum remained unaffected.

Similar tests were carried out for the same period with flasks of methyl chloroform maintained at room temperature and at −25° C. No reaction occurred in any case.

*Example 4*

The test of Example 3 was repeated at the boiling temperature, with zinc pellets introduced into the flask in contact with the scratched aluminum. Neither the zinc, the aluminum, nor the methyl chloroform was affected throughout a week's boiling, at which time the test was discontinued for extraneous reasons.

*Example 5*

Methyl chloroform containing 4 percent by volume of 1,4-dioxane was stored at room temperature for 2 months in standard black iron (sheet steel) shipping drums. The drums were not significantly attacked and the methyl chloroform showed no signs of decomposition. However, the methyl chloroform did develop a rusty discoloration.

An identical storage test was performed with methyl chloroform containing 4 percent by volume of 1,4-dioxane together with 0.2 percent by volume of sec. butyl alcohol. The drum was unaffected and the contents remained water-white.

Similar tests were performed except that tert. amyl alcohol and 2-octanol were used in place of the sec. butyl alcohol. In both tests, the drum and contents were unaffected.

*Example 6*

A flask was partly filled with methyl chloroform and a number of small iron nuts and bolts were inserted. The whole was then heated to boiling. After ten minutes, the methyl chloroform began to attack the iron, and rapidly decomposed to form carbon.

In a comparative test, methyl chloroform containing 4 percent by volume of 1,4-dioxane and 0.2 percent of sec. butyl alcohol was boiled under reflux in contact with iron nuts and bolts for 96 hours. The iron and the methyl chloroform were entirely unaffected.

The same result was observed in a test in which tert. amyl alcohol was used instead of sec. butyl alcohol. When the alcohol was 2-octanol, there was slight discoloration of the methyl chloroform after 96 hours' boiling, but no attack of the iron or decomposition of the methyl chloroform.

What is claimed is:

1. A composition of matter consisting essentially of methyl chloroform having 1,4-dioxane dissolved therein in a minor proportion sufficient to inhibit decomposition of the methyl chloroform when in contact with a metal selected from the group consisting of aluminum and iron.

2. Methyl chloroform containing from 1 to 10 percent by volume of 1,4-dioxane.

3. Methyl chloroform containing about 4 percent by volume of 1,4-dioxane.

4. A composition of matter, substantially non-corrosive to aluminum and iron, consisting essentially of methyl chloroform having dissolved therein from 1 to 10 percent by volume of 1,4-dioxane and from 0.01 to 10 percent by volume of a non-primary alkanol containing from 4 to 8 carbon atoms per molecule.

5. Methyl chloroform containing from 1 to 10 percent by volume of 1,4-dioxane and from 0.1 to 0.5 percent by volume of an alcohol selected from the group consisting of sec. butyl alcohol, tert. amyl alcohol, and 2-octanol.

6. A composition according to claim 5 wherein the alcohol is sec. butyl alcohol.

7. A composition according to claim 5 wherein the alcohol is tert. amyl alcohol.

8. A composition according to claim 5 wherein the alcohol is 2-octanol.

9. A method of inhibiting the decomposition of methyl chloroform during contact with a metal selected from the group consisting of aluminum and iron which comprises maintaining 1,4-dioxane dissolved in the methyl chloroform in a proportion between 1 and 10 percent by volume.

10. A method according to claim 9 wherein from 0.01 to 10 percent by volume of an alcohol selected from the group consisting of sec. butyl alcohol, tert. amyl alcohol, and 2-octanol is also maintained dissolved in the methyl chloroform.

11. In a process wherein methyl chloroform is boiled in contact with a metal selected from the group consisting of aluminum and iron, the method of preventing decomposition of the boiling liquid which comprises maintaining 1,4-dioxane dissolved in the methyl chloroform in a proportion between 1 and 10 percent by volume.

12. In the storage of methyl chloroform in a black iron container, the method of preventing both decomposition and discoloration of the methyl chloroform which comprises maintaining dissolved therein 1,4-dioxane in a proportion between 1 and 10 percent by volume and a non-primary alcohol containing from 4 to 8 carbon atoms per molecule in a proportion between 0.01 and 10 percent by volume.

13. As an article of manufacture, a closed black iron container having therein methyl chloroform stabilized against decomposition and discoloration by from 1 to 10 percent by volume of 1,4-dioxane and from 0.1 to 0.5 percent by volume of an alcohol selected from the group consisting of sec. butyl alcohol, tert. amyl alcohol, and 2-octanol.

References Cited in the file of this patent

UNITED STATES PATENTS

| | | |
|---|---|---|
| 2,371,644 | Petering et al. | Mar. 20, 1945 |
| 2,371,645 | Aitchison et al. | Mar. 20, 1945 |